US012223030B2

(12) United States Patent
Kakui

(10) Patent No.: US 12,223,030 B2
(45) Date of Patent: Feb. 11, 2025

(54) DATA ACCESS CONTROL METHOD, DATA ACCESS CONTROL APPARATUS, AND DATA ACCESS CONTROL PROGRAM

(71) Applicant: Hitachi, Ltd., Tokyo (JP)

(72) Inventor: Kentaro Kakui, Tokyo (JP)

(73) Assignee: HITACHI, LTD., Tokyo (JP)

(*) Notice: Subject to any disclaimer, the term of this patent is extended or adjusted under 35 U.S.C. 154(b) by 334 days.

(21) Appl. No.: 17/842,897

(22) Filed: Jun. 17, 2022

(65) Prior Publication Data

US 2022/0405377 A1 Dec. 22, 2022

(30) Foreign Application Priority Data

Jun. 21, 2021 (JP) ................. 2021-102711

(51) Int. Cl.
| | |
|---|---|
| *G06F 17/00* | (2019.01) |
| *G06F 7/00* | (2006.01) |
| *G06F 9/455* | (2018.01) |
| *G06F 16/2452* | (2019.01) |
| *G06F 21/44* | (2013.01) |
| *G06F 21/60* | (2013.01) |
| *G06F 21/62* | (2013.01) |

(52) U.S. Cl.
CPC ............. *G06F 21/44* (2013.01); *G06F 9/455* (2013.01); *G06F 16/2452* (2019.01); *G06F 21/604* (2013.01); *G06F 21/6218* (2013.01); *G06F 2221/21* (2013.01); *G06F 2221/2141* (2013.01)

(58) Field of Classification Search
CPC ...... G06F 21/44; G06F 16/2452; G06F 9/455; G06F 21/604; G06F 21/6218; G06F 2221/21; G06F 2221/2141
USPC ......................................................... 707/781
See application file for complete search history.

(56) References Cited

U.S. PATENT DOCUMENTS

| | | | | |
|---|---|---|---|---|
| 2001/0007128 A1* | 7/2001 | Lambert | ............... | H04L 63/126 713/165 |
| 2002/0002577 A1* | 1/2002 | Garg | ..................... | G06F 9/4488 718/104 |
| 2019/0138639 A1* | 5/2019 | Pal | ........................ | G06F 16/211 |
| 2020/0358823 A1 | 11/2020 | McCarty et al. | | |

\* cited by examiner

*Primary Examiner* — Pavan Mamillapalli
(74) *Attorney, Agent, or Firm* — MATTINGLY & MALUR, PC

(57) ABSTRACT

A policy determination unit acquires a rule for a request for accessing data based on a preset access control policy, and selects whether to acquire attribute information about an attribute of each record of the data from the outside of a database in which the data is stored. As a result, when selecting acquisition of the attribute information, the attribute information is acquired and the rule based on the attribute information is evaluated, and when selecting no acquisition of the attribute information, the database is caused to execute filtering of the data based on the rule. Then, based on the evaluation result of the rule or the filtering execution result, a record of the data corresponding to the access request is acquired from the database.

14 Claims, 11 Drawing Sheets

ORDER RECEPTION SLIP TABLE: ORDERS

| SLIP No | ORDERER | ORDER RECEPTION DATE | ... |
|---|---|---|---|
| ORD001 | CUS001 | 2020-10-01 | |
| ORD002 | CUS002 | 2020-10-02 | |
| ORD003 | CUS001 | 2020-10-03 | |
| ⋮ | | | |

521

502, 511

CUSTOMER TABLE: CUSTOMERS

| CUSTOMER No | CUSTOMER NAME | PERSON IN CHARGE | ... |
|---|---|---|---|
| CUS001 | Acme Co. | 1001 | |
| CUS002 | Beep Inc. | 1002 | |
| CUS003 | Coyote Ltd. | 1001 | |
| ⋮ | | | |

METADATA TABLE 601A

| id | TYPE | NAME | CAPABILITIES | BELONGS TO | ... |
|---|---|---|---|---|---|
| D500 | DB | DB01 | SQL | - | |
| D501 | Table | ORDERS | - | D500 | |
| D502 | Table | CUSTOMERS | - | D500 | |
| ... | | | | | |
| D510 | DB | DB02 | SQL | - | |
| D511 | Table | CUSTOMERS | - | D510 | |
| ... | | | | | |

611

METADATA TABLE 601B

| id | TYPE | NAME | CAPABILITIES | BELONGS TO | ... |
|---|---|---|---|---|---|
| D500 | DB | DB01 | SQL | - | |
| D501 | Table | ORDERS | - | D500 | |
| ... | | | | | |
| D510 | DB | DB02 | SQL | - | |
| D511 | Table | CUSTOMERS | - | D510 | |
| ... | | | | | |

FIG. 6

405A  ATTRIBUTE INFORMATION MANAGEMENT TABLE

| id | TARGET | NAME | PLACE | CAPABILITIES | ACCESS PATH | ... |
|---|---|---|---|---|---|---|
| A501 | RESOURCE | ORDER RECEPTION SLIP | DB01 | SQL | ORDERS.SLIP No | |
| A502 | SUBJECT | EMPLOYEE | DB01 | SQL | CUSTOMERS.PERSON IN CHARGE | |
| ... | | | | | | |

411A

405B  ATTRIBUTE INFORMATION MANAGEMENT TABLE

| id | TARGET | NAME | PLACE | CAPABILITIES | ACCESS PATH | ... |
|---|---|---|---|---|---|---|
| A501 | RESOURCE | ORDER RECEPTION SLIP | DB01 | SQL | ORDERS.SLIP No | |
| A511 | SUBJECT | EMPLOYEE | SV02 | REST | /customers/${id} | |
| ... | | | | | | |

411B

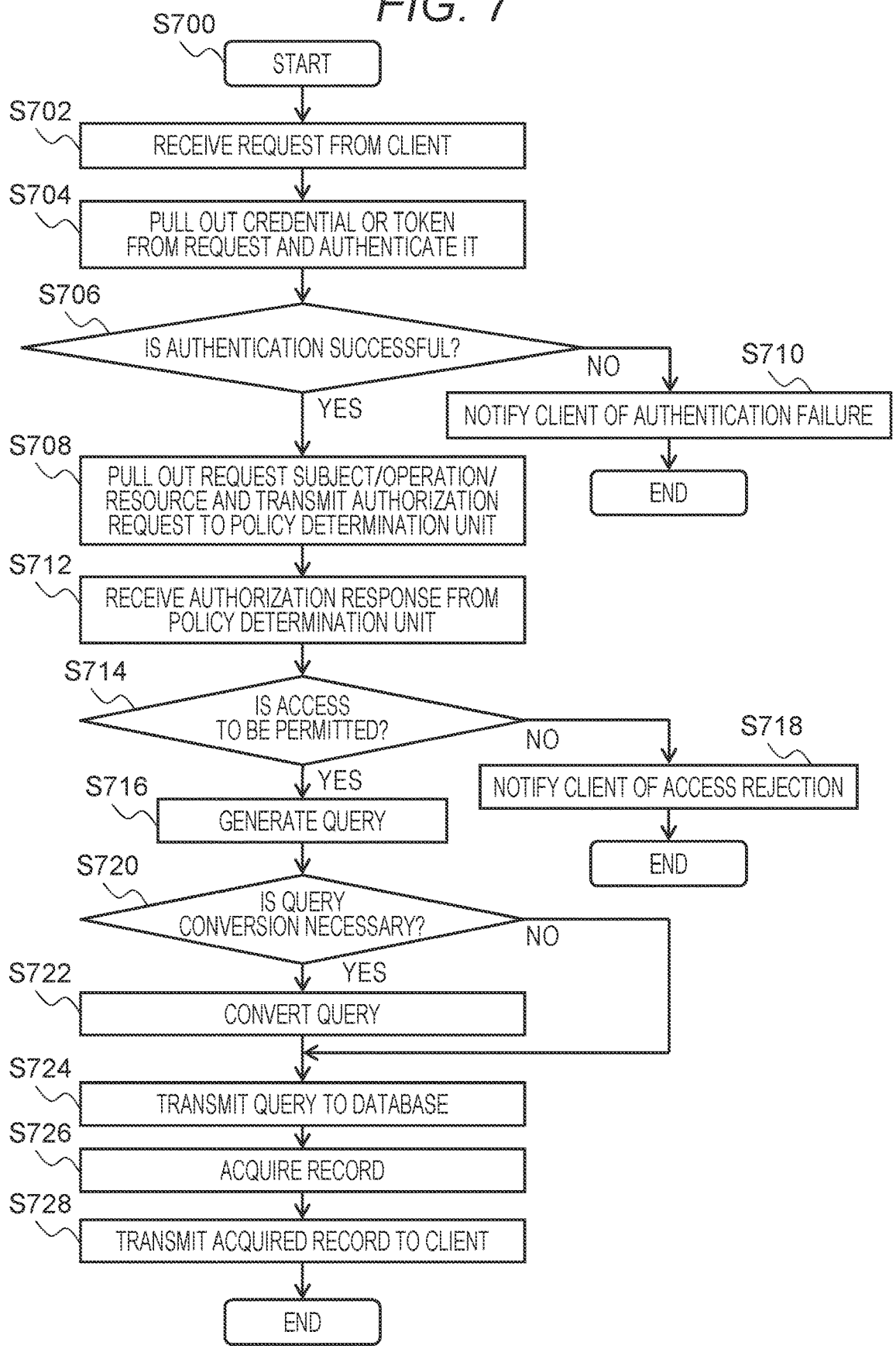

FIG. 11

METADATA TABLE 602

| id | TYPE | NAME | CAPABILITIES | CONNECT VIA | BELONGS TO | ... |
|---|---|---|---|---|---|---|
| D500 | DB | DB01 | SQL | - | - | |
| D501 | Table | ORDERS | - | D700 | D500 | |
| D502 | Table | CUSTOMERS | - | D700 | D500 | |
| ... | | | | | | |
| D510 | DB | DB02 | SQL | - | - | |
| D511 | Table | CUSTOMERS | - | D700 | D510 | |
| ... | | | | | | |
| D700 | DB | VDB | SQL | - | - | |
| ... | | | | | | |

613
612

DATA ACCESS CONTROL METHOD, DATA ACCESS CONTROL APPARATUS, AND DATA ACCESS CONTROL PROGRAM

CROSS-REFERENCE TO RELATED APPLICATION

The present application claims priority from Japanese application JP2021-102711, filed on Jun. 21, 2021, the contents of which is hereby incorporated by reference into this application.

BACKGROUND OF THE INVENTION

1. Field of the Invention

The present invention relates to a method, an apparatus, and a program for controlling data access.

2. Description of the Related Art

As a document disclosing the background art of the present invention, US 2020/0358823 A is known. US 2020/0358823 A describes a technique of generating an authentication rule according to a specific context based on a policy defined by an external policy service, and evaluating the authentication rule in an application to determine whether access to resources such as various databases is allowed for each user.

SUMMARY OF THE INVENTION

In conventional data access control, depending on a structure of a database to be accessed by a user, when a policy for access control is defined, it is necessary to enumerate and describe combinations of a user who is allowed or denied to access and data for each piece of data. In such a case, the description of the policy is enlarged, and the combination of the user and the data to be described in the policy is updated every day according to the update of the database, which causes a problem that it is difficult to maintain and manage the policy. The technique described in US 2020/0358823 A is insufficient in coping with such a problem.

Therefore, an object of the present invention is to facilitate maintenance management of an access control policy in data access control.

Solution to Problem

A data access control method according to the present invention is a data access control method performed by a computer, and the method includes acquiring, with the computer, a rule for a request for accessing first data, based on a preset access control policy, selecting, with the computer, whether to acquire attribute information about an attribute of each record of the first data from outside of a first database in which the first data is stored, when selecting acquisition of the attribute information, acquiring the attribute information and evaluating the rule based on the attribute information by the computer, and when selecting no acquisition of the attribute information, instructing, with the computer, the first database to execute filtering of the first data based on the rule, and outputting, with the computer, a record of the first data corresponding to the access request, based on an evaluation result of the rule or an execution result of the filtering.

A data access control apparatus according to the present invention includes a policy determination unit that acquires a rule for a request for accessing first data, based on a preset access control policy, and selects whether to acquire attribute information about an attribute of each record of the first data from outside of a first database in which the first data is stored, an attribute information acquisition unit that acquires the attribute information, a query unit that causes the first database to execute filtering of the first data based on the rule, and a communication unit that outputs a record of the first data corresponding to the access request, wherein the attribute information acquisition unit acquires the attribute information when the policy determination unit selects acquisition of the attribute information, wherein the policy determination unit evaluates the rule based on the attribute information acquired by the attribute information acquisition unit, wherein the query unit causes the first database to execute the filtering when the policy determination unit selects no acquisition of the attribute information, and wherein the communication unit outputs a record of the first data corresponding to the access request based on an evaluation result of the rule from the policy determination unit or an execution result of the filtering in the first database.

A data access control program according to the present invention causes a computer to execute a first process of acquiring a rule for a request for accessing first data, based on a preset access control policy, a second process of selecting whether to acquire attribute information about an attribute of each record of the first data from outside of a first database in which the first data is stored, a third process of, when selecting acquisition of the attribute information in the second process, acquiring the attribute information and evaluating the rule based on the attribute information, a fourth process of, when selecting no acquisition of the attribute information in the second process, instructing the first database to execute filtering of the first data based on the rule, and a fifth process of outputting a record of the first data corresponding to the access request based on an evaluation result of the rule by the third process or an execution result of the filtering by the fourth process.

Advantageous Effects of Invention

According to the present invention, it is possible to provide a data access control technology in which maintenance management of an access control policy is easy.

BRIEF DESCRIPTION OF THE DRAWINGS

FIG. 4 is a diagram illustrating an example of data stored in a database;

FIG. 5 is a diagram illustrating an example of a metadata table stored in a data catalog according to the first embodiment of the present invention;

FIG. 6 is a diagram illustrating an example of an attribute information management table created by an attribute information management table creation unit;

FIG. 7 is a flowchart of a process executed by a query service;

FIG. 11 is a diagram illustrating an example of a metadata table stored in a data catalog according to the second embodiment of the present invention.

DESCRIPTION OF THE PREFERRED EMBODIMENTS

Figure 1:
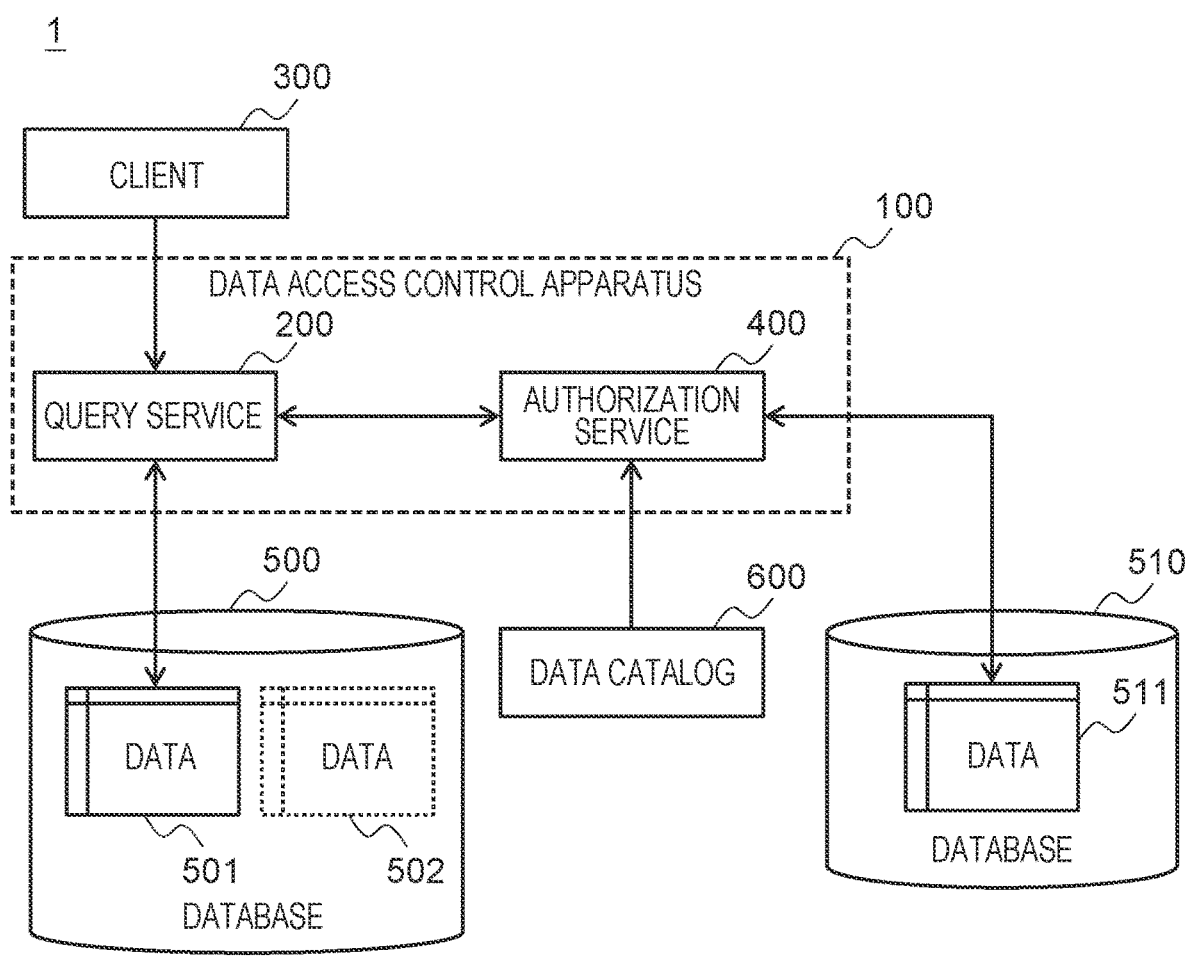
FIG. 1 is a block diagram illustrating a configuration of a service providing system including a data access control apparatus according to a first embodiment of the present invention.

Hereinafter, embodiments of the present invention will be described with reference to the drawings. For clarity of description, the following description and drawings are omitted and simplified as appropriate. The present invention is not limited to the present embodiment, and all application examples consistent with the idea of the present invention are included in the technical scope of the present invention. Unless otherwise specified, each component may be singular or plural.

In the following description, for example, various types of information may be described by expression of an "xxx list" or an "xxx table", but the various types of information may be expressed by a data structure other than a list or a table. In order to indicate that various types of information do not depend on the data structure, the "xxx list" or the "xxx table" may be referred to as "xxx information".

In addition, in the following description, reference numerals (or common portions in reference numerals) may be used when the same kind of elements are not distinguished from each other, and an ID of an element (or a reference numeral of an element) may be used when the same kind of elements are distinguished from each other.

In the following description, a "service providing system" is a system including one or more computers. Therefore, the "service providing system" may be one computer, may be a plurality of computers, or may include a device other than the computer in addition to the computer. The one or more computers typically include at least one physical computer.

The one or more computers may include at least one virtual computer.

In addition, in the following description, the "data access control apparatus" and the "client" may include one or more computers.

In the following description, processing may be described with a "program" or a process thereof as a subject. However, the subject of the processing may be a processor since the program is executed by a processor (for example, a central processing unit (CPU)) to perform predetermined processing appropriately using a storage resource (for example, memory) and/or a communication interface device (for example, a communication port). The processor operates as a function unit that realizes a predetermined function by operating according to the program. An apparatus and a system including a processor are an apparatus and a system each including the function unit.

In the following description, a "database" means a computer having a physical storage device, and may typically be a computer having a non-volatile storage device (for example, an auxiliary storage device). The auxiliary storage device may be, for example, a hard disk drive (HDD) or a solid state drive (SSD). Different types of storage devices may be mixed in the database.

First Embodiment

Hereinafter, a first embodiment of the present invention will be described.

FIG. 1 is a block diagram illustrating a configuration of a service providing system including a data access control apparatus according to a first embodiment of the present invention. A service providing system 1 illustrated in FIG. 1 is a system that provides various services to a user, and includes a data access control apparatus 100, a client 300, databases 500 and 510, and a data catalog 600. In the service providing system 1, these components are connected to each other via a network such as the Internet, a local area network (LAN), or a wide area network (WAN).

The data access control apparatus 100 has a query service 200 and an authorization service 400. The query service 200 receives a request transmitted from the client 300 when the user operates the client 300 including a personal computer (PC) or the like, and provides a service corresponding to the content of the request. For example, part or all of the data 501 specified in the request is acquired from the database 500, and is transmitted to the client 300 as a response to the request. Note that the request and the response in the query service 200 are typically defined as a RESTful API.

The authorization service 400 provides an authorization process for restricting access to the data 501 by the query service 200 for each user, depending on the attribute of the user transmitting the request from the client 300. The authorization service 400 may perform an authorization process based on the metadata acquired from the data catalog 600 or the data 511 stored in the database 510 and provide a result thereof.

The database 500 stores the data 501 and the data 502. The data 501, 502 is information in which a large number of records including a plurality of preset data items are collectively tabulated, and different data items are set. However, the data 502 is not necessarily stored in the database 500, and there is a case where the data 502 is not stored in the database 500 due to design or operation of an application for realizing the service providing system 1. Therefore, in the block diagram of FIG. 1, the data 502 is indicated by a broken line.

The database 510 stores the data 511. As in the data 501, 502 stored in the database 500, the data 511 is information in which a large number of records including a plurality of preset data items is collectively tabulated, and is tabulated based on a schema common to the data 502. Typically, the data 511 is the master and the data 502 is a duplicate thereof. As described above, there is a case where the data 502 is not stored in the database 500, but even in this case, the data 511 can be acquired from the database 510 instead of the data 502 and used in the authorization process since the authorization service 400 transmits a request to the database 510.

Whether to store the data 502 in the database 500 in the service providing system 1 is determined by, for example, a trade-off between a cost required for ensuring consistency between the data 502 and the data 511 and an overhead in acquiring the data 511 from the database 510. Which setting state is set may be selected at the time of designing or starting operation of an application for realizing the service providing system 1, or may be changed during operation.

The data catalog 600 collects and accumulates metadata that is information about the databases 500, 510 and the data 501, 502 and 511 stored therein. The authorization service 400 can determine whether to acquire the data 511 from the database 510 by referring to the metadata acquired from the data catalog 600.

Figure 2:
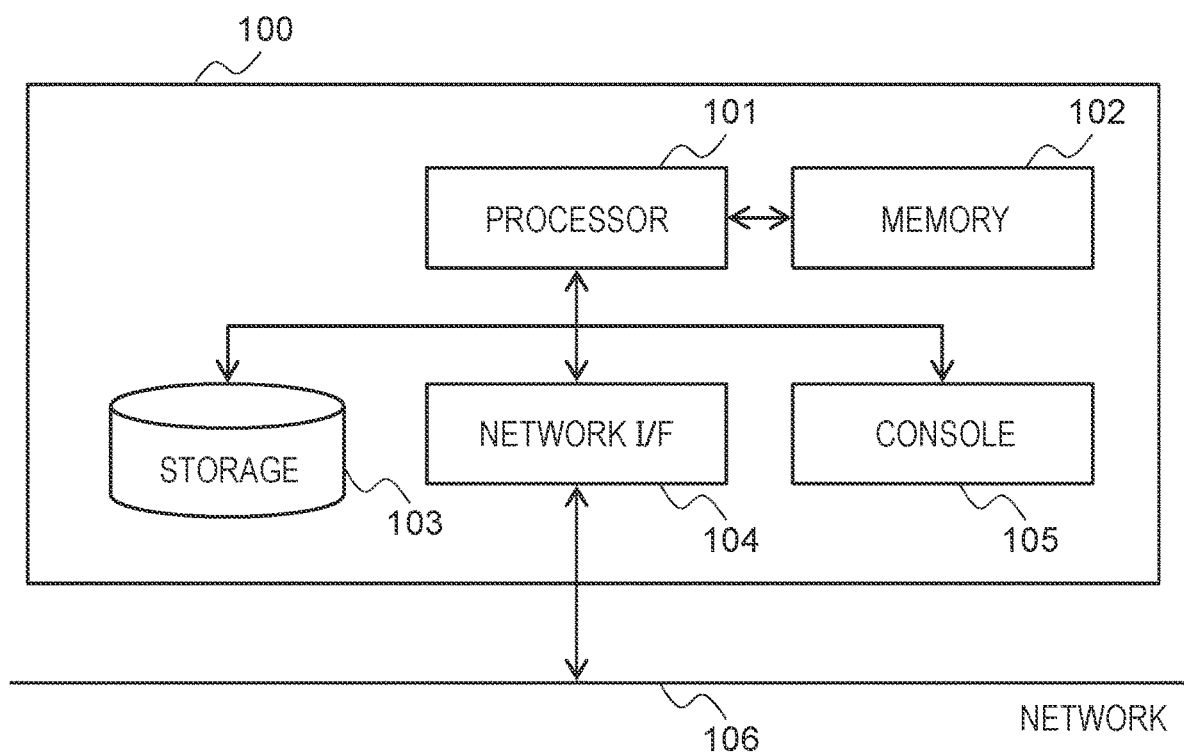
FIG. 2 is a diagram illustrating an example of a hardware configuration of a data access control apparatus.

FIG. 2 is a diagram illustrating an example of a hardware configuration of the data access control apparatus 100. As illustrated in FIG. 2, the data access control apparatus 100 includes, for example, a computer including a processor 101, a memory 102, a storage 103, a network interface (I/F) 104, and a console 105.

The processor 101 executes a predetermined program or application stored in the storage 103 by using the memory 102 as a work area, thereby performing arithmetic processing for realizing the query service 200 and the authorization service 400 in FIG. 1. The network I/F 104 is connected to the client 300, the databases 500 and 510, and the data catalog 600 in FIG. 1 via a network 106, and performs information communication with them in accordance with control of the processor 101. The console 105 is an input/output device used by an administrator who manages the service providing system 1, and includes, for example, a display, a mouse, a keyboard, and the like.

Note that, in the example of FIG. 2, a hardware configuration example in a case where the query service 200 and the authorization service 400 are implemented by one data access control apparatus 100 has been illustrated. However, the service may be implemented by separate hardware, or may be implemented by combining a plurality of pieces of hardware. Any hardware configuration can implement the data access control apparatus 100 that provides the query service 200 and the authorization service 400 to the client 300.

Figure 3:
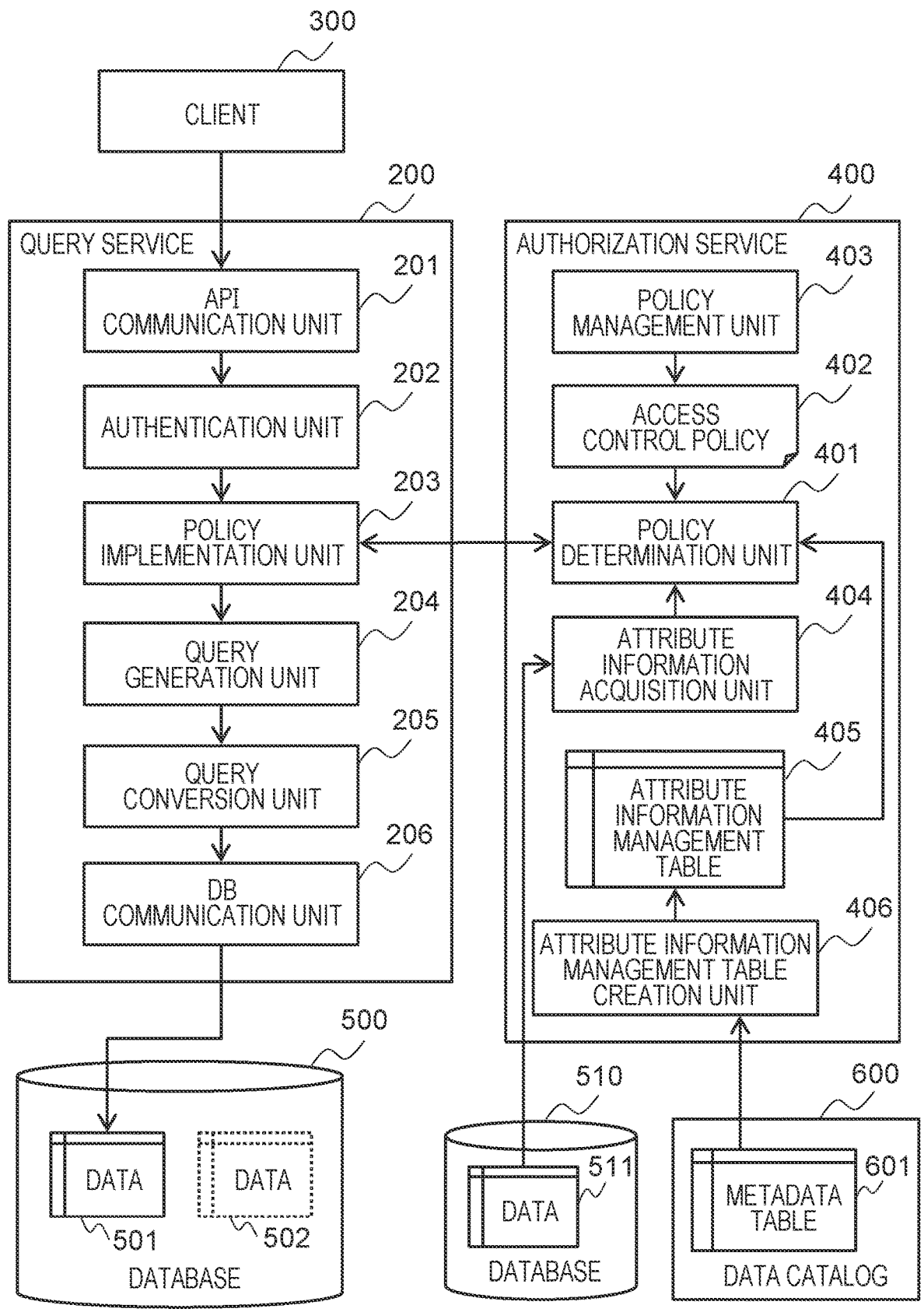
FIG. 3 is a functional block diagram illustrating functional configurations of a query service and an authorization service.

FIG. 3 is a functional block diagram illustrating a functional configuration of the query service 200 and the authorization service 400. In FIG. 3, the query service 200 includes functional blocks of an application programming interface (API) communication unit 201, an authentication unit 202, a policy implementation unit 203, a query generation unit 204, a query conversion unit 205, and a DB communication unit 206. In addition, the authorization service 400 includes functional blocks of a policy determination unit 401, a policy management unit 403, an attribute information acquisition unit 404, and an attribute information management table creation unit 406. These functional blocks are realized by, for example, arithmetic processing performed by the processor 101 in FIG. 2.

In the query service 200, the API communication unit 201 receives a request transmitted from the client 300. The authentication unit 202 authenticates the request received by the API communication unit 201 and identifies the user who has made the request, thereby identifying the subject of the request. Based on the result of the authorization process provided from the authorization service 400, the policy implementation unit 203 permits or denies access to the data 501 according to the subject of the request, and determines whether query conversion is necessary.

When access to the data 501 is permitted by the policy implementation unit 203, the query generation unit 204 generates a query for requesting the database 500 to acquire the data 501. The query conversion unit 205 converts the query generated by the query generation unit 204 in a case where the policy implementation unit 203 determines that query conversion is necessary. The DB communication unit 206 transmits the query generated by the query generation unit 204 and further converted by the query conversion unit 205 to the database 500 as necessary, thereby extracting and acquiring the record of the data 501 according to the request from the database 500. The record acquired by the DB communication unit 206 is transmitted to the client 300 by the API communication unit 201 as a response to the request.

In the authorization service 400, the policy management unit 403 manages an access control policy 402 used for the authorization process executed in the policy determination unit 401. The access control policy 402 is information indicating a rule for defining, for each subject, which record among a plurality of records included in the data 501 is permitted to be accessed by various users (subjects) who access the data 501 using the client 300, and for example, one set in advance in a predetermined file format such as an eXtensible access control markup language (XACML) is stored in the data access control apparatus 100. The policy management unit 403 acquires the access control policy 402 stored and held in the storage 103 of FIG. 2, for example, to output the access control policy 402 to the policy determination unit 401.

The attribute information acquisition unit 404 acquires attribute information about an attribute of each record of the data 511 from the data 501 stored in the database 510 as necessary. When the data 502 common to the data 511 is stored in the database 500, the attribute information acquisition unit 404 may not acquire the attribute information from the data 511.

The attribute information management table creation unit 406 acquires a metadata table 601 stored in the data catalog 600 and creates an attribute information management table 405 based on the metadata table 601. The metadata table 601 is acquired by tabulating the above-described metadata, and includes information about functions supported by various databases including the databases 500, 510 and information about data stored in each database. The attribute information management table creation unit 406 can create the attribute information management table 405 indicating a storage destination of the data by extracting and acquiring the information about the data 501, 502, and 511 from the metadata table 601. Note that details of the attribute information management table 405 will be described later.

The policy determination unit 401 performs an authorization process for a request from the client 300 based on the access control policy 402 output from the policy management unit 403, the attribute information acquired by the attribute information acquisition unit 404, and the attribute information management table 405 created by the attribute information management table creation unit 406. In this authorization process, it is determined whether to permit the access to the data 501 to the request, and which record of the data 501 is permitted to be accessed in a case where the access is permitted. A result of the authorization process by the policy determination unit 401 is transmitted to the policy implementation unit 203 of the query service 200.

FIG. 4 is a diagram illustrating an example of the data 501, 502, and 511 stored in the databases 500, 510. For example, an order reception slip table and a customer table having the data structure illustrated in FIG. 4 are stored as the data 501, 502 in the database 500, and a customer table having the same structure as the data 502 is stored as the data 511 in the database 510. These pieces of data are configured by a plurality of records, and a value of a data item set for each column corresponding to the field is stored in a field of each record. For example, in the order reception slip table of the data 501, values corresponding to data items such as "slip No.", "orderer", and "order reception date" are stored for a plurality of fields constituting each record, and in the customer table of the data 502, 511, values corresponding to data items such as "customer No.", "customer name", and "person in charge" are stored for a plurality of fields constituting each record. Among these data items, the "orderer" and the "customer No." have a correspondence relationship, and each record of the data 501 and each record of the data 502, 511 are associated with each other by the correspondence relationship.

The attribute information acquisition unit 404 can extract and acquire necessary information from the data 501 as the attribute information about the attribute of each record of the data 502 by the above association. For example, for the record 521 in which the value of "orderer" is "CUS001" in the data 501, the record 522 in which the value of "customer No." is the same "CUS001" can be extracted from the data 502, and the value of each field of the record 522 can be acquired as the attribute information about the record 521.

FIG. 5 is a diagram illustrating an example of the metadata table 601 stored in the data catalog 600 in the first embodiment of the present invention. As described above, the data 502 and the data 511 respectively stored in the databases 500, 510 are tabulated based on a common schema, but there is a case where the data 502 does not exist in the database 500 due to application design or operational reasons. Therefore, the configuration of the metadata table 601 in which the metadata is tabulated differs depending on whether the data 502 exists. In the example of FIG. 5, an example of the metadata table 601 when the data 502 exists is illustrated as a metadata table 601A, and an example of the metadata table 601 when the data 502 does not exist is illustrated as a metadata table 601B.

The difference between the metadata table 601A and the metadata table 601B is the presence or absence of a record 611 indicating the feature of the data 502 and the database to which the data 502 belongs. That is, the metadata table 601A in which the data 502 exists is configured to include the record 611 representing the metadata of the data 502, but the metadata table 601B in which the data 502 does not exist does not include the record 611 representing the metadata of the data 502.

FIG. 6 is a diagram illustrating an example of the attribute information management table 405 created by the attribute information management table creation unit 406. As described with reference to FIG. 5, the configuration of the metadata table 601 differs depending on whether the data 502 exists. Therefore, the configuration of the attribute information management table 405 created based on the metadata table 601 similarly differs depending on whether the data 502 exists. In the example of FIG. 6, an example of the attribute information management table 405 when the data 502 exists is illustrated as an attribute information management table 405A, and an example of the attribute information management table 405 when the data 502 does not exist is illustrated as an attribute information management table 405B.

In the attribute information management table 405A and the attribute information management table 405B, contents of records 411A and 411B respectively corresponding to the data 502 and the data 511 are different. That is, in the attribute information management table 405A in which the data 502 exists, the storage destination and the acquisition method of the attribute information based on the data 502 are recorded in a record 411A, and in the attribute information management table 405B in which the data 502 does not exist, the storage destination and the acquisition method of the attribute information based on the data 511 are recorded in a record 411B.

Specifically, in the attribute information management table 405A in FIG. 6, "DB01" and "SQL" stored in "arrangement place" and "function", respectively, of the record 411A indicate that the data 502 including the attribute information is stored in the database 500, and the attribute information can be acquired by an SQL instruction. Furthermore, in the attribute information management table 405B, "SV02" and "REST" stored in "arrangement place" and "function", respectively, of the record 411B indicate that the attribute information can be acquired by a service defined by a RESTful API.

Further, in the attribute information management table 405A, 405B, a descriptor for uniquely identifying an acquisition destination of the attribute information in the databases 500, 510 is stored in the "access path" of each record. Specifically, in each record of the attribute information management table 405A and each record, except for the record 411B, of the attribute information management table 405B, a concatenation of the table name and the column name of the data 501, 502 is stored in the "access path", and in the record 411B of the attribute information management table 405B, the path parameter specified in the request of the RESTful API is stored in the "access path".

The attribute information management table 405A is generated, for example, when the administrator of the service providing system 1 refers to the metadata table 601A and selects the data 502 as the attribute information about the access subject. On the other hand, the attribute information management table 405B is generated, for example, when the administrator of the service providing system 1 refers to the metadata table 601B and selects the data 511 as the attribute information about the access subject.

Next, details of processing performed by the data access control apparatus 100 will be described below with reference to a flowchart.

FIG. 7 is a flowchart of processing executed by the query service 200 of the data access control apparatus 100. When a request instructing access to the data 501 is transmitted from the client 300, the query service 200 starts the processing illustrated in the flowchart of FIG. (step S700).

The API communication unit 201 receives a request from the client 300 (step S702). The request includes information indicating which record among the plurality of records constituting the data 501 is to be acquired. For example, a request for acquiring a record whose value of "slip No." is "ORD001" in the data 501 is described as "GET/orders/ORD001 HTTP/1.1".

The authentication unit 202 pulls out the credential or the token included in the request received by the API communication unit 201 in step S702, and authenticates the request using the pulled-out credential or token (step S704). For example, when the received request is an API based on HTTP, a credential or a token is typically included in a header field of the request. When the request is successfully authenticated in step S704, the query service 200 can identify the user (subject) who has transmitted the request.

For the authentication performed in step S704, for example, Basic authentication, JWT authentication, or the like can be used. As a specific authentication execution method, for example, Basic authentication is to check a password included in a credential, and JWT authentication is to verify a signature of a token. As described above, the processing content of step S704 may be different depending on the authentication method, but in any case, the authentication is successful if the subject of the request can be identified. When the subject of the request can be identified in step S704, it is determined that the authentication is successful (step S706: Yes), and the process proceeds to step S708. On the other hand, when the subject of the request cannot be identified in step S704, it is determined that the authentication has failed (step S706: No), and the process proceeds to step S710.

When the authentication succeeds, the policy implementation unit 203 transmits the information on the subject identified by the authentication unit 202 in step S704 and the information on the operation and resource pulled out from the received request to the policy determination unit 401 as an authorization request (step S708). On the other hand, when the authentication fails, the API communication unit 201 notifies the client 300 that the authentication fails (step S710), and ends the processing illustrated in the flowchart of FIG. 7.

When receiving the authorization request transmitted from the policy implementation unit 203 in step S708, the policy determination unit 401 performs an authorization process to transmit a result thereof to the policy implementation unit 203 as an authorization response. The policy implementation unit 203 receives the authorization response transmitted from the policy determination unit 401 (step S712).

Based on the content of the authorization response received from the policy determination unit 401 in step S712, the policy implementation unit 203 determines whether to permit access to the data 501 with respect to the request the API communication unit 201 receives from the client 300 in step S702 (step S714). When the policy determination unit 401 determines to permit access to the data 501 and an authorization response indicating the determination result is received in step S714, it is determined that access is permitted (step S714: Yes), and the process proceeds to step S716. On the other hand, when the policy determination unit 401 determines to deny access to the data 501 and the authorization response indicating the determination result is received in step S714, it is determined that the access is denied (step S714: No), and the process proceeds to step S718.

When an authorization response indicating that access to the data 501 is permitted is received from the policy determination unit 401, the query generation unit 204 generates a query for acquiring a desired record from the data 501 stored in the database 500 with respect to the request received by the API communication unit 201 from the client 300 in step S702 (step S716). For example, when the database 500 is a database using SQL as a query language, and a request for acquiring a record whose value of "slip No." is "ORD001" in the data 501 is transmitted from the client 300, a query instructing this to the database 500 is described as "select * from orders where slip No='ORD001';". As a result, the query service 200 generates a query according to the access request from the client 300 to the data 501. On the other hand, when the policy determination unit 401 receives an authorization response indicating that access to the data 501 is denied, the API communication unit 201 notifies the client 300 that access to the data 501 is denied (step S718), and ends the processing illustrated in the flowchart of FIG. 7.

When the query is generated by the query generation unit 204 in step S716, the query conversion unit 205 determines whether query conversion is necessary (step S720). Here, the policy implementation unit 203 determines the presence or absence of query conversion based on the authorization response received from the policy determination unit 401 in step S712. That is, when the received authorization response includes the query conversion instruction, the query conversion unit 205 determines that the query conversion is necessary (step S720: Yes), and executes the processing of step S722. On the other hand, when the received authorization response does not include the query conversion instruction, the query conversion unit 205 determines that the query conversion is unnecessary (step S720: No), and the process proceeds to step S724 without executing the process of step S722.

When it is determined that the query conversion is necessary, the query conversion unit 205 converts the query generated by the query generation unit 204 in step S716 into a query for combining and filtering the data 501 and the data 502 stored in the database 500 (step S722). For example, in a case where the value of the "person in charge" corresponding to the user (subject) identified by the authentication in step S704 is "1001", the query acquired by converting the query by SQL described in the above example is described as "select * from orders inner join customers on (orders·orderer=customers·customer No) where customers·person in charge='1001' and orders. slip No='ORD001';". As a result, in the query service 200, the data 501 to be accessed and the data 502 including the attribute information about the data 501 are combined from the query generated in response to the request in step S716, and a query for causing the database 500 to execute filtering based on the rule described in the access control policy 402 is generated.

The DB communication unit 206 transmits, to the database 500, the query generated by the query generation unit 204 in step S716 (when the processing in step S722 is not executed) or the query after conversion generated by the query conversion unit 205 converting the query generated by the query generation unit 204 in step S722 (step S724).

The DB communication unit 206 acquires a record of data 501 output by the database 500 in response to the query transmitted in step S724 (step S726). The API communication unit 201 outputs a record of the data 501 acquired by the DB communication unit 206 in step S726 as a response to the request received in step S702 to transmit the record to the client 300 (step S728). When the API communication unit 201 transmits the response to the request to the client 300, the query service 200 ends the processing flow of FIG. 7.

Figure 8:
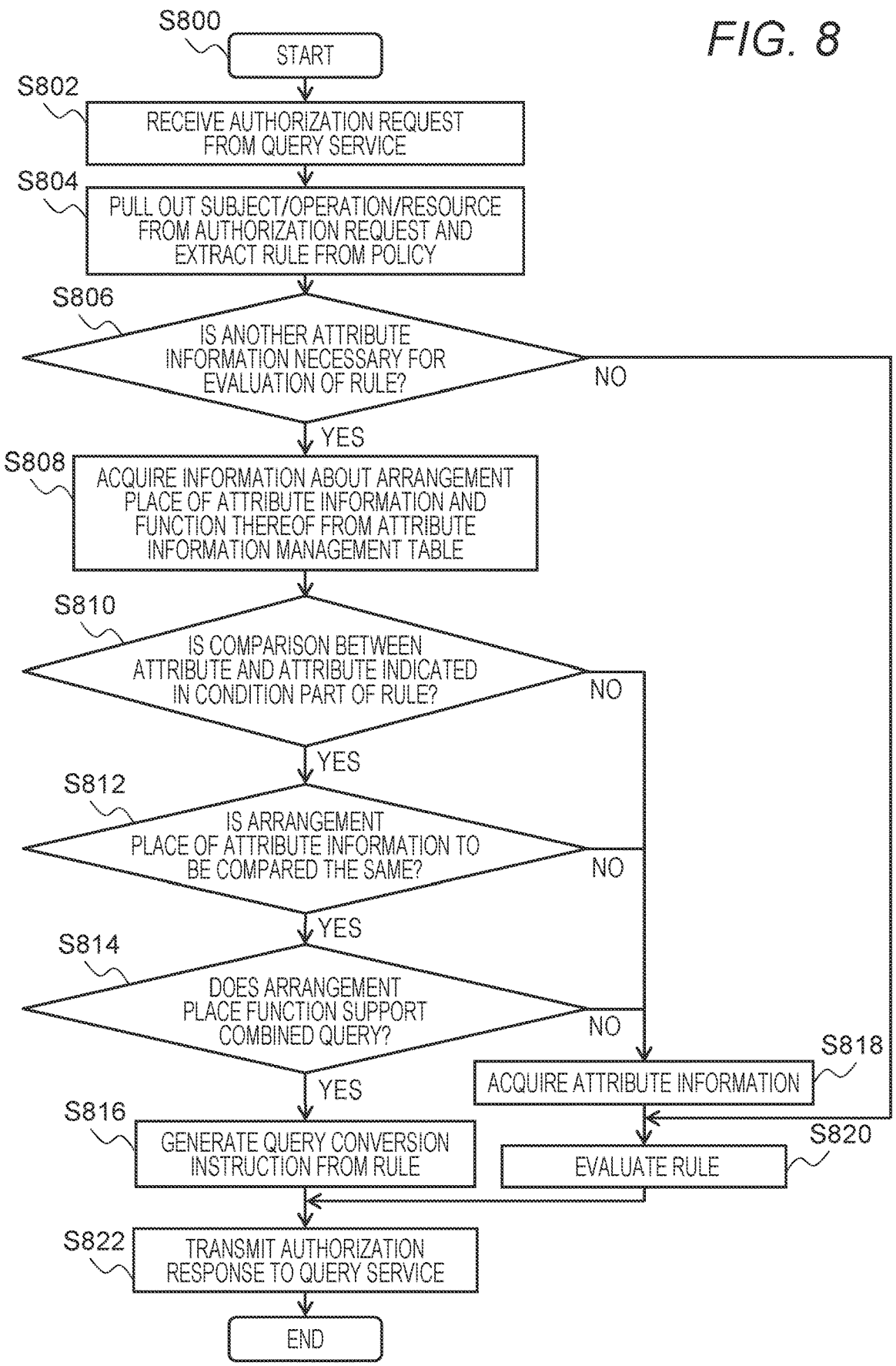
FIG. 8 is a flowchart of a process executed by an authorization service.

FIG. 8 is a flowchart of processing executed by the authorization service 400 of the data access control apparatus 100. When the authorization request is transmitted from the policy implementation unit 203 in step S708 of FIG. 7, the authorization service 400 starts the processing illustrated in the flowchart of FIG. 8 (step S800).

The policy determination unit 401 receives an authorization request from the policy implementation unit 203 of the query service 200 (step S802). As described above, the authorization request includes information about subject, operation, and resource in the request received by the query service 200 from the client 300.

The policy determination unit 401 pulls out each piece of information about a subject, an operation, and a resource from the authorization request received in step S802. In addition, by acquiring the access control policy 402 from the policy management unit 403 and pulling out a rule defined in the access control policy 402, a rule for a request for accessing the data 501 performed from the client 300 is acquired (step S804).

The policy determination unit 401 compares each piece of information about the subject, the operation, and the resource pulled out from the authorization request in step S804 with the rule extracted in step S804, and determines whether attribute information different from the attribute information included in the resource is required for evaluation of the rule for the operation (step S806). Here, for example, it is determined whether another piece of attribute information is necessary as follows.

As described above, it is assumed that a request for acquiring a record whose value of "slip No." is "ORD001" in the data 501 is transmitted from the client 300, and an authorization request for the request is received from the query service 200. In addition, it is assumed that a rule defined in the access control policy 402 includes matching between a value of "orderer" of the record specified in the request and a value of "customer No." corresponding to a person in charge number assigned to the user who has transmitted the request through the client 300. In such a case, in order to evaluate the rule, it is necessary to determine the attribute of the user who has transmitted the request using a value of "person in charge" that is attribute information included in data 502, 511 different from data 501 that is a resource. Therefore, in such a case, it is determined in step S806 that another piece of attribute information is necessary. On the other hand, when comparison of records between different data is not necessary in evaluation of the rule, it is determined in step S806 that the different attribute information is unnecessary, and the process proceeds to step S820. Note that the above example is merely an example, and it is possible to determine in step S806 whether attribute information different from the attribute information included in the resource is necessary for evaluation of various rules.

As a result of the determination in step S806, when it is determined that another attribute information is necessary (step S806: Yes), the process proceeds to step S808, and when it is determined that the another attribute information is unnecessary (step S806: No), the process proceeds to step S820.

When it is determined in step S806 that another attribute information is necessary, the policy determination unit 401 refers to the attribute information management table 405 created by the attribute information management table creation unit 406 to acquire information on the arrangement place of the attribute information and the function thereof from the attribute information management table 405 (step S808). For example, in the above-described example, by referring to the record 411A of the attribute information management table 405A or the record 411B of the attribute information management table 405B, it is possible to acquire the information indicating the data 502 stored in the database 500 or the information indicating the data 511 stored in the database 510 as the arrangement place of the attribute information necessary for the evaluation of the rule. Furthermore, as the function of the arrangement place of the attribute information, information about the function supported by the database 500 or information about the function supported by the database 510 can be acquired.

The policy determination unit 401 determines whether the content indicated in the condition part of the rule extracted in step S804 is a comparison between an attribute and an attribute (step S810). For example, as described above, in the case of a rule that the value of "orderer" of the record specified in the request matches the value of "customer No." corresponding to the person in charge number assigned to the user who has transmitted the request by the client 300 match, the condition part of the rule describes a remark in which the attribute indicated by the value of "orderer" of the data 501 is compared with the attribute indicated by the value of "customer No." of the data 502, 511. Therefore, in this case, it is determined that the content indicated in the condition part of the rule is the comparison between the attribute and the attribute (step S810: Yes), and the process proceeds to step S812. On the other hand, when it is determined that the content indicated in the condition part of the rule is not the comparison between the attribute and the attribute (step S810: No), the process proceeds to step S818.

The policy determination unit 401 determines whether the arrangement place of the attribute information to be compared in the evaluation of the rule is the same, based on the information about the arrangement place acquired from the attribute information management table 405 in step S808 (step S812). For example, as described above, in a case where the information that the arrangement place of the attribute information necessary for the evaluation of the rule is in the database 500 that is served as the storage destination of the data 501 is acquired by referring to the record 411A of the attribute information management table 405A, it is determined that the arrangement place is the same (step S812: Yes), and the process proceeds to step S814. On the other hand, when it is determined that the arrangement place is not the same (step S812: No), the process proceeds to step S818.

The policy determination unit 401 determines whether the function of the arrangement place of the attribute information to be compared in the evaluation of the rule supports a combined query of combining a plurality of pieces of data tables, based on the information about the function of the arrangement place acquired from the attribute information management table 405 in step S808 (step S814). For example, as described above, in a case where the database 500, which is the arrangement place of the attribute information necessary for the evaluation of the rule, acquires the information that the operation is performed by the SQL that can use the combined query by referring to the record 411A of the attribute information management table 405A, it is determined that the combined query is supported (step S814: Yes), and the process proceeds to step S816. On the other hand, when it is determined that the combined query is not supported (step S814: No), the process proceeds to step S818.

When all the determination results of steps S810, S812, and S814 are positive determinations, the policy determination unit 401 generates a query conversion instruction for the query service 200 from the rule extracted in step S804 (step S816). Here, the query conversion instruction is generated so as to convert the query generated by the query generation unit 204 in step S716 of FIG. 7 into the query as described above including the combined query according to the rule. As a result, the query service 200 is instructed to combine the data 501 and the data 502 and cause the database 500 to execute filtering based on the rule. When the query conversion instruction is generated in step S816, the process proceeds to step S822.

When the determination result of any one of steps S810, S812, and S814 is a negative determination, the policy determination unit 401 acquires attribute information necessary for evaluation of the rule based on the information acquired in step S808 (step S818). Here, for example, the data 511 is read from the database 510 and the attribute information is acquired based on the information acquired by referring to the record 411B of the attribute information management table 405B.

When step S818 is executed or when the determination result of step S806 is a negative determination, the policy determination unit 401 evaluates the rule extracted in step S804 (step S820). Here, when step S818 is executed, the rule is evaluated using the attribute information acquired in step S818 together with each piece of information about the subject, the operation, and the resource acquired from the authorization request in step S804. On the other hand, when it is determined in step S806 that another attribute information is unnecessary, the rule is evaluated based on each piece of information about the subject, the operation, and the resource acquired from the authorization request in step S804. As a result, it is determined whether to permit access to the data 501 for the authorization request received from the query service 200. When the rule can be evaluated in step S820, the process proceeds to step S822.

The policy determination unit 401 transmits an authorization response to the authorization request received in step S802 to the query service 200 (step S822). The authorization response includes either the query conversion instruction generated in step S816 or the evaluation result of the rule performed in step S820. When the policy determination unit 401 transmits the authorization response, the authorization service 400 ends the processing flow of FIG. 8.

Note that, in the query service 200, the policy implementation unit 203 receives the authorization response transmitted from the policy determination unit 401 in step S822 of FIG. 8 in step S712 of FIG. 7. As a result, the query service 200 can proceed to processing of step S714 and subsequent steps.

Figure 9:
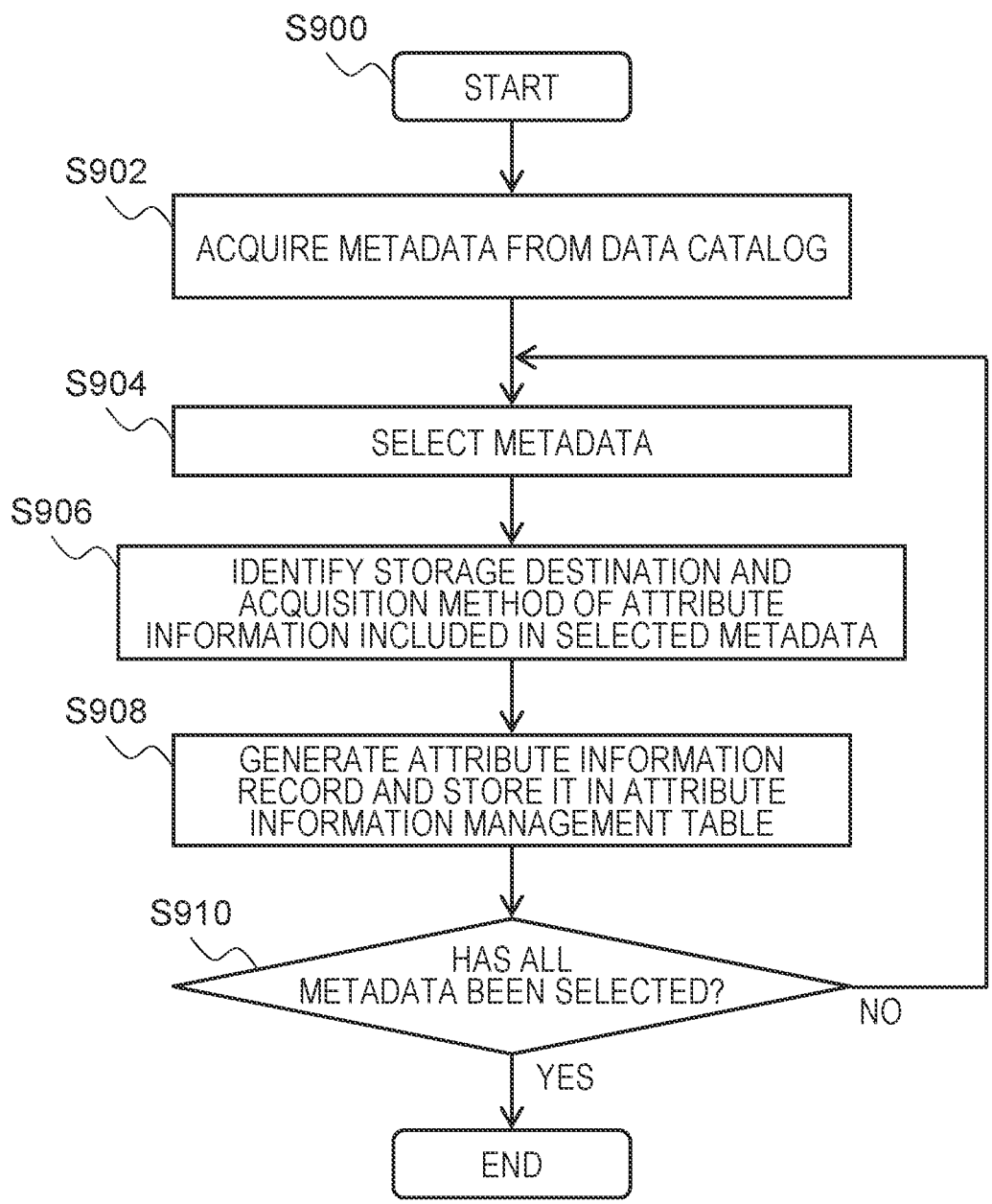
FIG. 9 is a flowchart of processing executed when an attribute information management table is created in an authorization service.

FIG. 9 is a flowchart of processing executed when the attribute information management table creation unit 406 creates the attribute information management table 405 in the authorization service 400 of the data access control apparatus 100. The attribute information management table creation unit 406 starts the processing illustrated in the flowchart of FIG. 9 at a predetermined timing before the processing of FIG. 8 is executed in the authorization service 400 (step S900).

The attribute information management table creation unit 406 acquires the metadata from the data catalog 600 (step S902). Here, metadata is acquired by reading the metadata table 601A or the metadata table 601B illustrated in FIG. 5 from the data catalog 600.

The attribute information management table creation unit 406 selects any of the pieces of metadata acquired in step S902 (step S904). Here, metadata is selected by selecting any record in the metadata table 601A, 601B.

The attribute information management table creation unit 406 identifies a storage destination and an acquisition method of the attribute information included in the metadata selected in step S904 (step S906). Here, for example, the storage destination and the acquisition method of the attribute information can be identified by identifying the identification name of the data including the attribute information indicated by the metadata, the database in which the data is stored, the function of the database, and the like from the content of each item included in the selected record. Alternatively, the storage destination and the acquisition method of the attribute information may be identified from the information input by the administrator of the service providing system 1, or the identifying methods may be combined. In addition to this, the storage destination and the acquisition method of the attribute information can be identified by any method.

The attribute information management table creation unit 406 creates an attribute information record that is a record representing information about the attribute information based on the storage destination and the acquisition method of the attribute information acquired in step S906 to store the attribute information record in the attribute information management table 405A or the attribute information management table 405B (step S908).

When the attribute information record is stored in the attribute information management table 405A, 405B in step S908, the attribute information management table creation unit 406 determines whether all the pieces of metadata have been selected in step S904 (step S910). When all the records have been selected in the metadata table 601A, 601B, it is determined that all the metadata has been selected (step S910: Yes), and the processing flow of FIG. 9 ends. On the other hand, when there is an unselected record in the metadata table 601A, 601B, it is determined that not all the pieces of metadata have been selected (step S910: No), and the process returns to step S904 to continue the selection of the metadata.

The attribute information management table creation unit 406 can generate the attribute information management table 405A from the metadata table 601A or the attribute information management table 405B from the metadata table 601B by executing the processing described above.

According to the first embodiment of the present invention described above, the following operational effects are achieved.

(1) The data access control apparatus 100 acquires a rule for a request for accessing the data 501 based on the preset access control policy 402 (step S804), and selects whether to acquire attribute information about an attribute of each record of the data 501 from the outside of the database 500 in which the data 501 is stored (steps S810 to S814). As a result, when selecting acquisition of the attribute information (step S810: No, step S812: No, or step S814: No), the attribute information is acquired (step S818), and the rule based on the attribute information is evaluated (step S820). When selecting not acquisition of the attribute information (Steps S810, S812, and S814: Yes), the database 500 is caused to execute filtering of the data 501 based on the rule (Steps S816, S722, and S724). Then, a record of the data 501 corresponding to the access request is acquired from the database 500 based on the evaluation result of the rule performed in step S820 or the execution result of the filtering by the database 500 (step S726). With this configuration, it is possible to reliably evaluate the rule regardless of whether information necessary for evaluation of the rule defined in the access control policy 402 is stored in the database 500. Therefore, it is possible to provide a data access control technology that facilitates maintenance and management of an access control policy.

(2) The data access control apparatus 100 selects no acquisition of the attribute information from the outside of the database 500 when the data 502 including the attribute information is stored in the database 500 (step S812: Yes), and selects acquisition of the attribute information from the outside of the database 500 when the data 502 is not stored in the database 500 (step S812: No). Thus, it is possible to appropriately select whether to acquire the attribute information from the outside of the database 500 according to the presence or absence of the data 502.

(3) When selecting no acquisition of the attribute information from the outside of the database 500, the data access control apparatus 100 combines the data 501 and the data 502 to cause the database 500 to execute filtering (steps S816, S722, and S724). In this way, since it is not necessary to evaluate the rule in the data access control apparatus 100, it is possible to reduce the overhead at the time of accessing the data 501 and to realize high-speed access control.

(4) However, even when the data 502 is stored in the database 500, in a case where the data 501 and the data 502 cannot be combined in the database 500 (step S814: No), it selects acquisition of the attribute information from the outside of the database 500. With this configuration, even when the database 500 does not have a function of combining the plurality of data tables, it is possible to reliably evaluate the rule.

(5) The data access control apparatus 100 provides, by a processor 101 that is, for example, a computer, the query service 200 that generates a query according to an access request, and the authorization service 400 that performs the authorization process based on the access control policy 402 for the access request. In the authorization service 400, the policy determination unit 401 selects whether to acquire the attribute information from the outside of the database 500 (steps S810 to S814). Then, in a case of selecting acquisition of the attribute information, the acquisition of the attribute information and the evaluation of the rule are performed (steps S818 and S820), and in a case of selecting no acquisition of the attribute information, a query for causing the database 500 to execute filtering is output from the query service 200 (steps S816, S722, and S724). With this configuration, the data access control apparatus 100 can be implemented using a computer.

(6) In the query service 200, the query conversion unit 205 converts the query generated by the query generation unit 204 into a query for causing the database 500 to execute filtering in accordance with an instruction from the authorization service 400 (step S722). Then, the DB communication unit 206 outputs the data to the database 500 (step S724). With this configuration, the filtering of the data 501 based on the rule can be reliably executed by the database 500.

(7) The data access control apparatus 100 refers to the attribute information management table 405 indicating the arrangement place and the function of the attribute information (step S808), and selects whether to acquire the attribute information from the outside of the database 500. With this configuration, it is possible to reliably and easily select whether to acquire the attribute information from the outside of the database 500.

(8) The data access control apparatus 100 acquires the metadata regarding the database 500 storing the data 501 and the databases 500, 510 storing the data 502, 511 including the attribute information from the metadata table 601A, 601B by the attribute information management table creation unit 406 (steps S902 and S904). Then, the attribute information management table 405A, 405B is created based on the acquired metadata (steps S906 and S908). With this configuration, it is possible to reliably and easily create the attribute information management table indicating the arrangement place of the attribute information and the function thereof.

(9) The metadata used to create the attribute information management table 405A, 405B includes information on a function supported by each of the database 500 and the database 510, and information on the database to which the data 501 and the data 511 belong, as exemplified in each record of the metadata table 601A, 601B of FIG. 5. In this way, information necessary for creating the attribute information management table 405A, 405B can be reliably acquired from the metadata.

Second Embodiment

Next, a second embodiment of the present invention will be described. Hereinafter, differences from the first embodiment will be mainly described, and description of common points with the first embodiment will be omitted or simplified unless otherwise necessary.

In the present embodiment, an example in which the database 500 and the database 510 are connected to the data access control apparatus 100 via the virtualization layer will be described.

Figure 10:
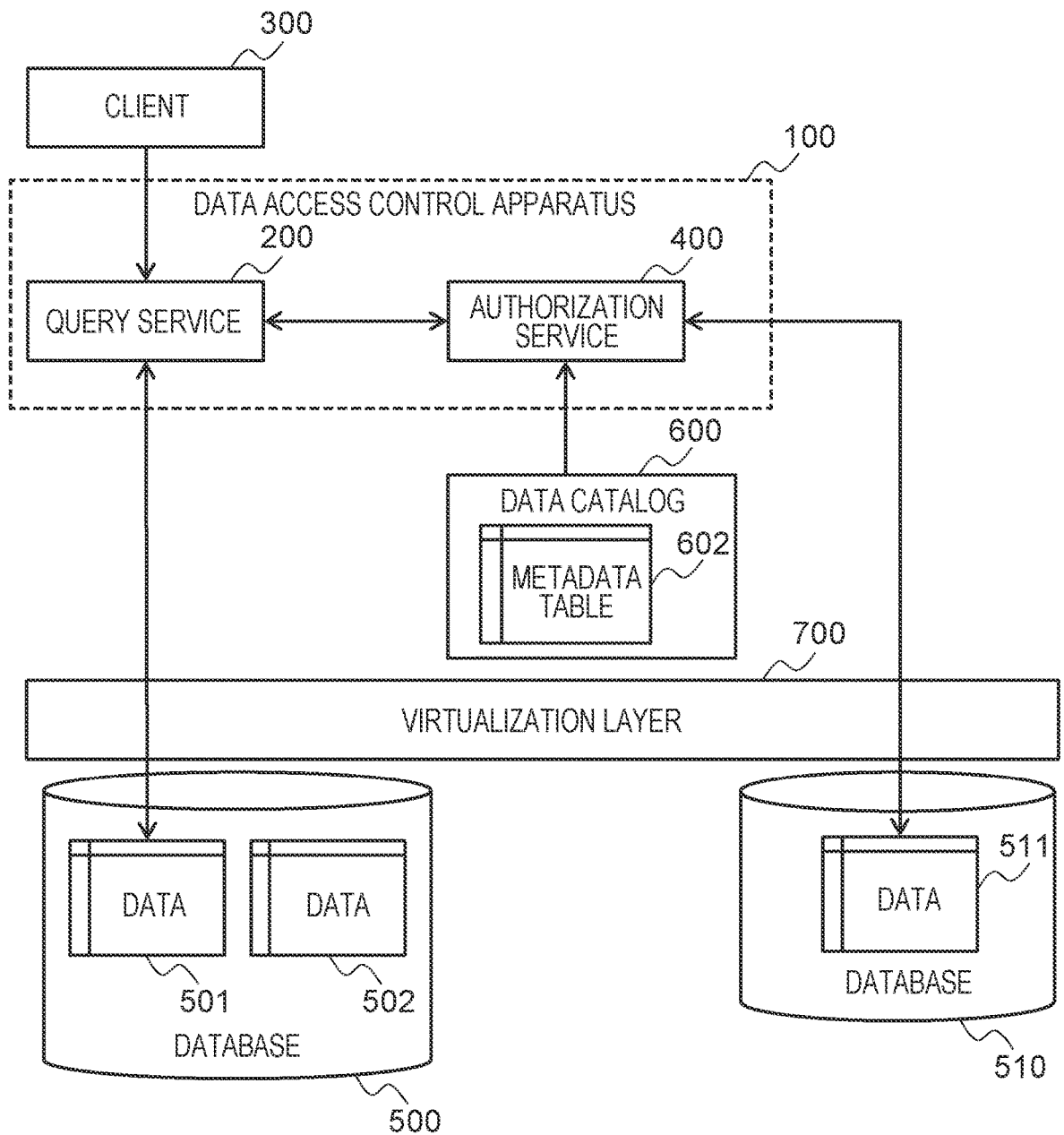
FIG. 10 is a block diagram illustrating a configuration of a service providing system including a data access control apparatus according to a second embodiment of the present invention.

FIG. 10 is a block diagram illustrating a configuration of a service providing system including a data access control apparatus according to the second embodiment of the present invention. A service providing system 1A illustrated in FIG. 10 includes a data access control apparatus 100, a client 300, databases 500 and 510, and a data catalog 600, as in the service providing system 1 of FIG. 1 described in the first embodiment. The present embodiment is different from the first embodiment in that the databases 500, 510 are connected to the data access control apparatus 100 via a virtualization layer 700, and a metadata table 602 is stored in a data catalog 600. The virtualization layer 700 provides an interface through which the data access control apparatus 100 can issue a query to the databases 500, 510 as if the data 501, 502, and 511 stored in separate databases 500, 510 were stored in a single database.

FIG. 11 is a diagram illustrating an example of the metadata table 602 stored in the data catalog 600 in the second embodiment of the present invention. In the metadata table 602 illustrated in FIG. 11, a record 612 indicating information about the virtualization layer 700 is added unlike the metadata table 601A, 601B of FIG. 5 described in the first embodiment. Further, in the record of the data 501, 502, and 511 among the records of the metadata table 602, information indicating that the connection destination is the virtualization layer 700 is added to a column 613.

In the present embodiment, the attribute information management table creation unit 406 creates the attribute information management table 405 based on the metadata table 602. At this time, the attribute information management table 405 is created so as to include the information about the virtualization layer 700 in the record indicating the storage destination and the acquisition method of the attribute information based on the data 511.

Furthermore, in the present embodiment, the query service 200 converts the query generated by the query generation unit 204 in step S716 into a query for causing the database 500 to execute filtering based on the rule described in the access control policy 402 by combining the data 501 and the data 511 via the virtualization layer 700 in step S722 of FIG. 7. As a result, even when the data 501 and the data 511 are stored in different databases 500, 510, it is possible to combine these data and execute filtering based on the rule.

As described above, in the service providing system 1A of the present embodiment, the database 500 and the database 510 are connected to the data access control apparatus 100, which is a computer that creates the attribute information management table 405, via the virtualization layer 700. The metadata table 602 stored in the data catalog 600 further includes information about the virtualization layer 700. The data access control apparatus 100 combines the data 501 and the data 511 via the virtualization layer 700 to cause the database 500 to execute filtering. In this way, even when the data 501 and the data 511 are stored in different databases 500, 510, it is possible to combine these data and execute filtering based on the rule.

Note that each record of the metadata table 602 may further include information indicating validity of data combination via the virtualization layer 700 and information on priority of data combination. In this way, it is possible to more appropriately determine whether to execute filtering by data combination via the virtualization layer 700 between different databases for each data.

The present invention is not limited to the above embodiments, and can be implemented using any components without departing from the gist of the present invention. For example, the functional blocks of the query service 200 and the authorization service 400 illustrated in FIG. 3 may be realized by different hardware. Alternatively, any functional block may be included in the client 300, or may be included in the database 500 or the database 510. Further, some or all of the functional blocks in FIG. 3 may be realized by hardware such as a field-programmable gate array (FPGA).

The embodiments and modifications described above are merely examples, and the present invention is not limited to these contents as long as the features of the invention are not impaired. Although various embodiments and modifications have been described above, the present invention is not limited to these contents. Other aspects conceivable within the scope of the technical idea of the present invention are also included within the scope of the present invention.

What is claimed is:

1. A data access control method performed by a computer, the method comprising:
   receiving, by the computer, over a network from a client device associated with a user, a request for accessing first data stored in a first database associated with the computer;
   acquiring, with the computer, a rule for the request for accessing the first data stored in the first database, wherein, based on a preset access control policy, the rule defines which records included in the first data the user is authorized to access based on whether attribute information for a respective record in the first data indicates the user is authorized to access the record;
   selecting, with the computer, whether to acquire attribute information about an attribute of a record of the first data from a second database outside of the first database in which the first data is stored, wherein the selecting includes referring to an attribute information management data structure that indicates a record in the second database that includes an entry containing the attribute information for the record of the first data that indicates whether the user is authorized to access the record of the first data based on the rule, the record in the second database being related to the record in the first data based on another entry in the record in the second database having a value that matches an entry in the record of the first data;
   when selecting acquisition of the attribute information, acquiring the attribute information and evaluating the rule based on the attribute information with the computer;
   when selecting no acquisition of the attribute information, instructing, with the computer, the first database to execute filtering of the first data based on the rule; and
   acquiring, with the computer, at least one record of the first data corresponding to the access request from the first database, based on an evaluation result of the rule or an execution result of the filtering, and sending the at least one record to the client device.

2. The data access control method according to claim 1, wherein
   the method includes selecting no acquisition of the attribute information when second data including the attribute information is stored in the first database, and selecting acquisition of the attribute information when the second data is not stored in the first database.

3. The data access control method according to claim 2, wherein
   when selecting no acquisition of the attribute information, the method includes combining the first data and the second data to cause the first database to execute the filtering.

4. The data access control method according to claim 3, wherein
   even when the second data is stored in the first database, in a case where the first data and the second data cannot be combined in the first database, the method includes selecting acquisition of the attribute information.

5. The data access control method according to claim 1, wherein the method includes using the computer to provide a query service that generates a first query according to the access request and an authorization service that performs an authorization process based on the access control policy for the access request, and
   wherein the authorization service
      selects whether to acquire the attribute information from outside of the first database, and
      when selecting acquisition of the attribute information, acquires the attribute information and evaluates the rule, and
      when selecting no acquisition of the attribute information, causes the query service to output a second query for causing the first database to execute the filtering.

6. The data access control method according to claim 5, wherein
   the query service converts the generated first query into the second query according to an instruction from the authorization service and outputs the second query to the first database.

7. The data access control method according to claim 1, wherein
   the attribute information management table further indicates an arrangement place of the attribute information and a function thereof to select when acquiring the attribute information from outside of the first database.

8. The data access control method according to claim 7, wherein
   the method includes acquiring, with the computer, metadata regarding the first database in which the first data is stored and a second database in which second data including the attribute information is stored, and creating the attribute information management table, based on the acquired metadata.

9. The data access control method according to claim 8, wherein
   the metadata includes information about a function supported by each of the first database and the second database, and information about databases to which the first data and the second data belong.

10. The data access control method according to claim 9, wherein
    the first database and the second database are each connected, via a virtualization layer, to the computer that creates the attribute information management table, and
    the metadata further includes information about the virtualization layer.

11. The data access control method according to claim 10, wherein
    the method includes combining the first data and the second data via the virtualization layer to cause the first database to perform the filtering.

12. The data access control method according to claim 11, wherein the metadata further includes information about validity and priority of data combination via the virtualization layer.

13. A data access control apparatus comprising:
a processor:
a memory in communication with the processor, the memory storing instructions executable by the processor for causing the processor to perform operations comprising:
  receiving, by the processor, over a network from a client device associated with a user, a request for accessing first data stored in a first database associated with the computer;
  acquiring, by the processor, a rule for the request for accessing the first data stored in the first database, wherein, based on a preset access control policy, the rule defines which records included in the first data the user is authorized to access based on whether attribute information for a respective record in the first data indicates the user is authorized to access the record
  selecting, by the processor, whether to acquire attribute information about an attribute of a record of the first data from a second database outside of the first database in which the first data is stored, wherein the selecting includes referring to an attribute information management data structure that indicates a record in the second database that includes an entry containing the attribute information for the record of the first data that indicates whether the user is authorized to access the record of the first data based on the rule, the record in the second database being related to the record in the first data based on another entry in the record in the second database having a value that matches an entry in the record of the first data;
  acquiring, by the processor, the attribute information for the record of the first data when acquisition of the attribute information is selected for evaluating the rule, based on the attribute information acquired;
  causing, by the processor, the first database to execute the filtering when no acquisition of the attribute information is selected; and
  acquiring, by the processor, at least one record of the first data corresponding to the access request from the first database, based on an evaluation result of the rule or an execution result of the filtering in the first database, and sending the at least one record to the client device.

14. A non-transitory computer storage medium storing a data access control program executable by a computer for causing the computer to execute operations comprising:
  receiving, by the computer, over a network from a client device associated with a user, a request for accessing first data stored in a first database associated with the computer;
  acquiring, by the computer, a rule for the request for accessing the first data stored in the first database, wherein, based on a preset access control policy, the rule defines which records included in the first data the user is authorized to access based on whether attribute information for a respective record in the first data indicates the user is authorized to access the record;
  selecting, by the computer, whether to acquire attribute information about an attribute of a record of the first data from a second database outside of the first database in which the first data is stored, wherein the selecting includes referring to an attribute information management data structure that indicates a record in the second database that includes an entry containing the attribute information for the record of the first data that indicates whether the user is authorized to access the record of the first data based on the rule, the record in the second database being related to the record in the first data based on another entry in the record in the second database having a value that matches an entry in the record of the first data;
  when selecting acquisition of the attribute information, acquiring, by the computer, the attribute information and evaluating the rule based on the attribute information;
  when selecting no acquisition of the attribute information, instructing, by the computer, the first database to execute filtering of the first data based on the rule; and
  acquiring, by the computer, a record of the first data corresponding to the access request from the first database, based on an evaluation result of the rule or an execution result of the filtering, sending the at least one record to the client device.

* * * * *